United States Patent

[11] 3,624,376

[72] Inventor Norbert Kitz
Uxbridge, Middlesex, England

[21] Appl. No. 845,811
[22] Filed July 29, 1969
[45] Patented Nov. 30, 1971
[73] Assignee Bell Punch Company Limited
London, England

[54] CIRCUIT FOR GENERATING SIGNALS REPRESENTATIVE OF OPERATED KEYS ON A COMMON LEAD
13 Claims, 5 Drawing Figs.

[52] U.S. Cl. .......... 235/160, 340/365
[51] Int. Cl. .......... G06f 1/00, G08c 9/00
[50] Field of Search .......... 235/160, 145; 340/365; 178/80

[56] References Cited
UNITED STATES PATENTS

| | | | |
|---|---|---|---|
| 3,293,640 | 12/1966 | Chalfin et al. ................ | 340/365 |
| 3,308,280 | 3/1967 | Crowther et al. ............. | 235/160 |
| 3,430,226 | 2/1969 | Chow et al. .................... | 340/365 |
| 3,466,647 | 9/1969 | Guzak, Jr. .................... | 340/365 |

*Primary Examiner*—Malcolm A. Morrison
*Assistant Examiner*—David H. Malzahn
*Attorney*—Laurence R. Brown

ABSTRACT: An electronic calculating machine provides electronic signals for number keys that identify each key at a common lead conveying signals from a plurality of keys. The signals are generated from a pulse generator and counter circuit so that each key produces a different waveform within a period during which the pulse generator produces 10 pulses PO to P9. Each signal contains a common reference pulse PO.

INVENTOR
Norbert Kitz
By Laurence R. Brown
Attorney

CIRCUIT FOR GENERATING SIGNALS REPRESENTATIVE OF OPERATED KEYS ON A COMMON LEAD

This invention has reference to calculating machines and has particular reference to a circuit for generating electrical signals representative of the operated keys of the keyboard of the calculating machine. Such calculating machines have a keyboard which has at least 10 digit keys which represent the digits 0 to 9 respectively and which has function keys which represent the functions or program operations which can be performed on the calculating machine. Depression of a digit key initiates the generation of an electrical signal which is unique to that key and which is supplied to the internal circuits in the calculating machine. Depression of a function key initiates the generation of an electrical signal which is unique to that function and which is used to operate the function gating circuits used to perform that function.

It is known hitherto that keys of the keyboard have each been associated with a key switch which was operated by depression of the key and which was connected to a line along which a signal has been transmitted when the key was depressed. The number of lines which have connected the key switch associated with each key to the circuits operated by each key have been substantially equal to the number of keys of the keyboard. The large number of lines required for the keys of the keyboard has resulted in the disadvantages caused by the need for a complex circuit having many connections in order to connect the key switch circuits to other circuits of the calculating machine.

An object of the present invention is to provide an improved calculating machine.

A further object of the invention is to provide a circuit for generating electrical signals representative of the operated keys of a keyboard of a calculating machine.

According to the invention there is provided a calculating machine having a circuit for generating electrical signals representative of the operated keys of a keyboard, said signal-generating circuit comprising a pulse counter and pulse lengthener whose input is connected to a source of pulses, a keyboard comprising a plurality of keys each key including a key switch having at least two contacts which are moved by the operation of the key, one of the contacts of the key switch is connected to one of the outputs of the pulse counter and lengthener, a bistable circuit one of whose inputs is connected to the other contacts of the key switches and the other of whose inputs is connected to an output of the pulse counter and lengthener; whereby, when a key of the keyboard is operated, the output of the bistable circuit is changed from one state to the other state by the lengthened pulse output associated with the operated key and connected to the one input of the bistable circuit and the output of the bistable circuit is changed from the other state to the one state by the output of the pulse counter and lengthener connected to the other input of the bistable circuit so that the output of the bistable circuit transmits a signal representative of the operated key.

A constructional embodiment made in accordance with the invention will now be described by way of example, with reference to the accompanying drawings wherein.

Figure 1:
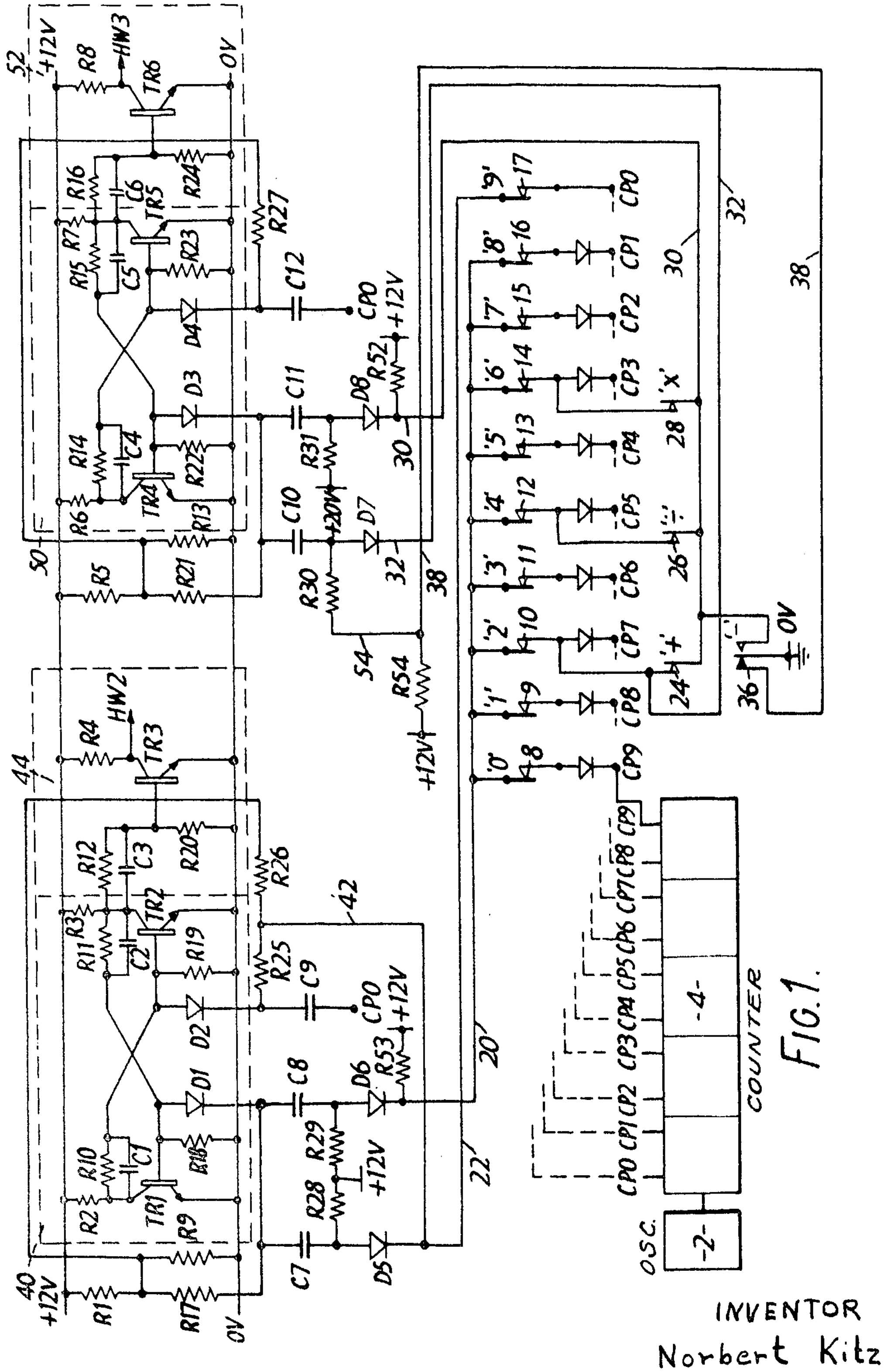
FIG. 1 shows a circuit made according to the invention for generating electrical signals representative of the operated keys of a keyboard.
Figure 2:
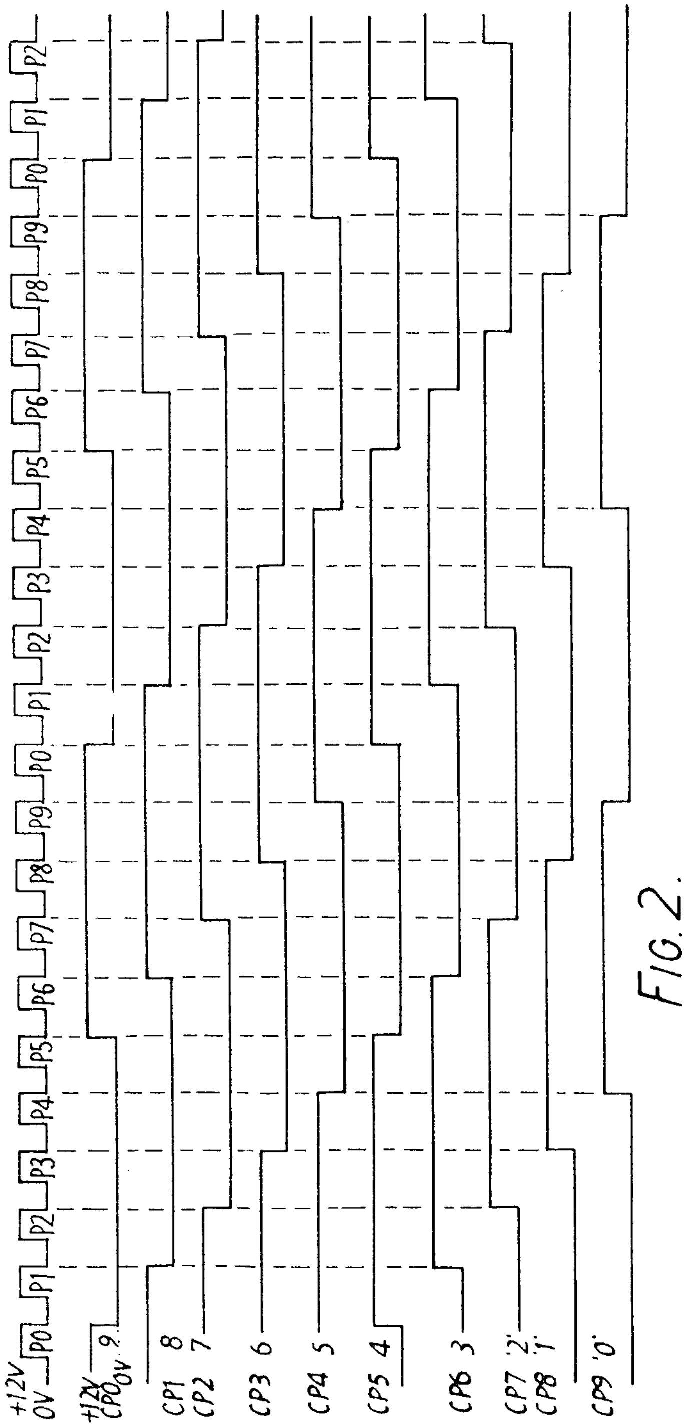
FIG. 2 shows the pulse inputs and the lengthened pulse outputs from a pulse counter and lengthener.

The circuit for generating electrical signals representative of the operated keys of a keyboard is shown in FIG. 1. The Figure shows a master oscillator 2 which generates oscillator pulses which are 'on' at +12 volts and 'off' at 0 volt. The oscillator pulses which are successively generated by the oscillator 2 are labeled in sequence P0, P1, P2, P3, P4, P5, P6, P7, P8, P9 as shown in FIG. 2 for the purpose of identification. The output of the oscillator 2 is connected to the input of a pulse counter and lengthener 4 shown as a rectangle in FIG. 1. The pulse counter and lengthener 4 consists of five bistable circuits which are interconnected in a known manner so as to form a Johnson ring or 'switch tail' ring. The 10 outputs of lengthened pulses and the waveforms from the outputs of the pulse counter and lengthener 4 are sequentially labeled CPO, CP1, CP2, CP3, CP4, CP5, CP6, CP7, CP8, CP9 and are sequentially energized at the input pulse repetition frequency of the oscillator 2. The input pulse frequency is 10 times the output pulse repetition frequency. The waveforms CP0 to CP9 are 'on' at +12 volts and 'off' at 0 volt as shown in FIG. 2. A set of key switches comprising the 10 normally open key switches 8 to 17 are operated by the respective keys (not shown) of a set of 10 keys which are marked to represent the digits 0 to 9 respectively on a keyboard (not shown). The outputs CP1 to CP9 of the pulse counter and lengthener 4 are connected to a contact of the key switches 16 to 8 respectively through a reverse-biased diode respectively and the output CP0 is directly connected to a contact of the key switch 17. The other contacts of the key switches 8 to 16 are connected to a line 20. The other contact of the key switch 17 is connected to a line 22.

The outputs CP7, CP5 and CP3 which are connected to the key switches 10, 12 and 14 are connected to one of the pair of contacts of the normally open key switches 24, 26 and 28 respectively. The other contact of the pair of contacts of the key switches 24, 26 and 28 are connected to a line 30. The key switches 24, 26 and 28 are operated by respective keys (not shown) which represent the arithmetic function of addition, division and multiplication respectively. A line 32 is connected to the output CP7 on the input side of the key switch 10. A changeover key switch 36 has two fixed contacts and a movable contact: the normally open contact, which is shown as a hollow triangle in the FIG. 1, is connected to the line 30; the normally closed contact, which is shown as a solid triangle in the FIG. 1, is connected to a line 38; and the movable contact is connected to earth potential. The changeover key switch 36 is operated by a key (not shown) which represents the arithmetic function of subtraction.

A digit bistable circuit 40 which is of well known construction, has a potential divider circuit in which the resistors R1 and R9 divide a potential of +12 volts and in which the resistors R17 and R25 and R26 bias the input diodes D1 and D2 respectively. The bistable circuit 40 has an other or 'reset' input circuit which comprises a capacitor C9, a diode D2 and the resistors R25 and R26. The bistable circuit 40 has a one or 'set' input circuit which comprises a first gate circuit comprising a capacitor C8, a diode D6, the resistor R29 and the resistor R53 which is connected to the line 20, and comprises a second gate circuit comprising the capacitor C7, the diode D5 and the resistor R28. The line 22 is connected to the cathode of the diode D5. An inhibit line 42 connects the input of the second gate to the junction of the resistors R25 and R26 of 'reset' input circuit. An output of the bistable circuit 40 is connected to the input of an inverter circuit 44 whose output is connected to a digit highway line HW2.

A function bistable circuit 50, which is of well-known construction, has a potential divider circuit in which the resistors R5 and R13 divide the potential of +12 v. and the resistors R21 and R27 bias the input diodes D3 and D4 respectively. The bistable circuit 50 has a 'reset' input circuit which comprises a capacitor C12 with a diode D4 and a resistor R27. The bistable circuit 50 has a 'set' input circuit which comprises a first gate circuit comprising a capacitor C11, a diode D8, a resistor R31 and a resistor R52 which is connected to the line 30 and a second gate circuit comprising a capacitor C10, a diode D7 and the resistors R30 and R54. The cathode of the diode D7 is connected to the line 32. The resistor R54 is connected to the line 38. The resistor R30 is connected to the resistor R54 by a line 54. An output of the bistable circuit 50 is connected to the input of an inverter circuit 52 whose output is connected to a function highway line HW3.

The signal-generating circuit shown in FIG. 1 operates as follows:

The negative-going edge of the waveform CPO, which is coincident with the back edge of the pulse PO is applied through the capacitor C9 and diode D2 and the capacitor C12 and the diode D4 of the bistable circuits 40 and 50 respectively. The negative-going edge of the waveform CPO is passed to the base of the transistors TR2 and TR5 of the bistable circuits 40 and 50 so that these transistors do not conduct and the respective collectors of the transistors transistors TR2 and TR5 are at +12 volts. Because of the bistable circuit connection, the collectors of the transistors TR1 and TR4 of the bistable circuits 40 and 50 respectively are at 0 volts. The bases of the transistors TR3 and TR6 of the inverter circuits 44 and 52 respectively are connected to the collectors of the transistors TR2 and TR5 of the bistable circuits 40 and 50 respectively so that these transistors conduct and the digit highway line HW2 and the function highway line HW3 are at 0 volt. The transistors TR1 to TR6 remain with their respective collectors at the voltages previously described while the waveform CPO is applied to the bistable circuits 40 and 50. However, when the negative-going edge of one of the waveforms CP0 to CP9 or the waveforms CP3, CP5 or CP7, is passed through the diode D1 or D3 of the bistable circuits 40 or 50 respectively, the collector voltages of the transistors TR1 to TR6 are reversed to +12 volts or 0 volt. In particular, the collectors of the transistors TR3 or TR6 of the inverter circuit 44 or 52 are reversed to +12 volts so that the digit highway line HW2 or the function highway line HW3 is at +12 volts. A waveform is continuously generated along the digit highway HW2 or the function highway HW3 while the waveforms CP0 and one of the waveforms CP1 to CP9 or the waveforms CP3, CP5 or CP7, are applied to the inputs of the bistable circuit 40 or 50 respectively. The waveform output obtained on the digit highway HW2 when the waveform CP0 is applied to both inputs of the bistable circuit 40 is described later.

Figure 3:
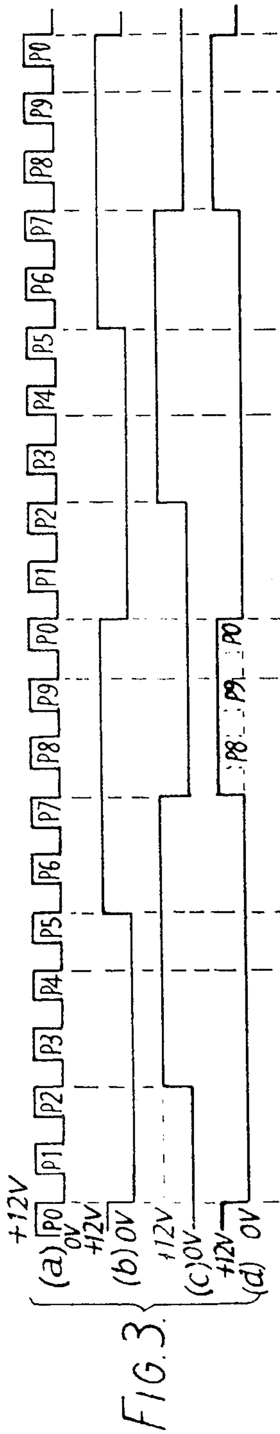
FIGS. 3, 4 and 5 show the waveforms at various points on FIG. 1 when three different electrical signals are generated by the signal-generating circuit shown in FIG. 1.

The FIG. 3 shows the waveforms at various points on the bistable circuit 40 or 50 when the waveform CP7 FIG. 3 (*c*) is applied with the waveforms CP0 FIG. 3 (*b*) to the respective input of the bistable circuit 40 or 50. At the end of a pulse PO—shown in FIG. 3 (*a*) for ease of comparison of relationships between pulses—the digit highway line HW2 or the function highway line HW3 is switched by the waveform CPO to 0 volt and at the end of a pulse P7 the digit highway line HW2 is switched by the waveform CP7 to +12 volts. The alternate action of the waveform CPO and the waveform CP7 on the bistable circuit 40 or 50 causes the generation of the continuous waveform shown in FIG. 3 (*d*). The continuous waveform shown in FIG. 3 (*d*) is a waveform which occurs simultaneously with the pulses P8, P9 and PO. The waveform in FIG. 3 (*d*) is either transmitted along the digit highway HW2 when the key switch 10 is closed by the key (not shown) representing the digit 2 or is transmitted along the function highway HW3 when the key switch 24 is closed by a key (not shown) representing the arithmetic function of addition.

Figure 4:
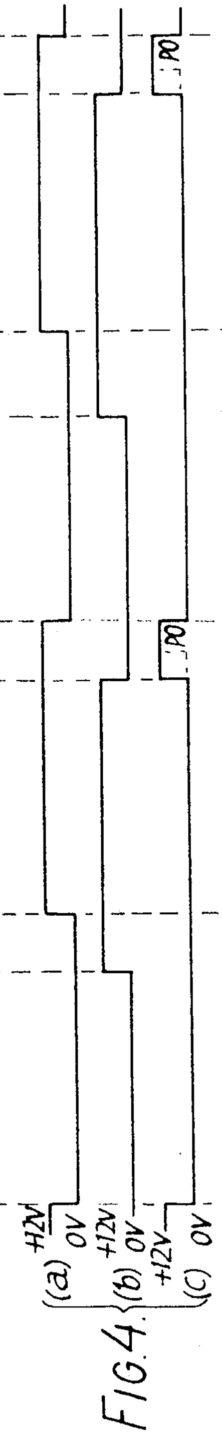

Similarly, the FIG. 4 shows in FIG. 4 (*c*) the continuous waveform which is generated along the digit highway line HW2 when the waveform CP9 (FIG. 4 (*b*)) and the waveform CP0 (FIG. 4 (*a*)), are to the inputs of the bistable circuit when the key switch 8 is closed by the key (not shown) representing the digit 0. The continuous waveform shown in FIG. 4 (*c*) is a waveform which occurs simultaneously with the pulse PO.

Figure 5:
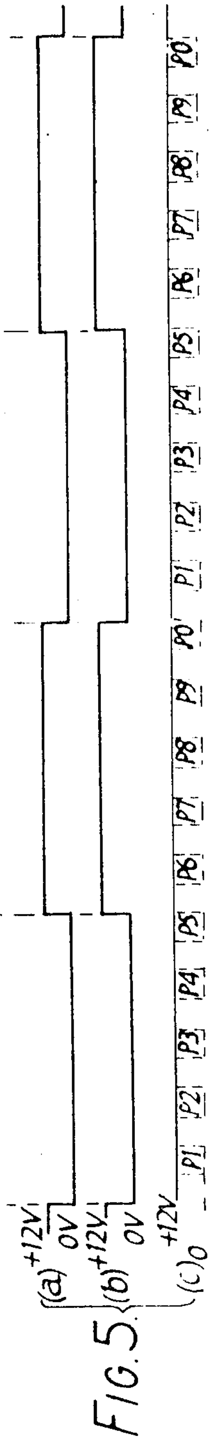

In the FIG. 5, the waveform CP0 (FIG. 5 (*a*) and 5 (*b*)) is applied to both inputs of the bistable circuit 40 as a result of the closure of the key switch 17 by depression of the key (not shown) representing the digit 9. The waveform CPO is transmitted along the line 22 and through the diode D5, the capacitor C7 and the diode D1 to the base of the transistor TR1. The waveform CP0 transmitted along the line 22 is also transmitted along the inhibit line 42 to pulse the junction of the capacitor C9 with the diode D2 from the positive potential set by the potential divider formed by the resistors R1 and R9 to zero potential. The waveform CP0 is directly applied to the other connection of the capacitor C9. Because the capacitor C9 is pulsed to substantially the same potential on both of its connections, the CP0 waveform applied to the input circuit of the transistor TR2 is prevented from having an effect upon the transistor TR2, so that the collector of the transistor TR3 and the digit highway HW2 are kept at a potential of +12 volts while the waveform CPO is transmitted along the line 22. The output on the digit highway HW2 is shown in FIG. 5 (*c*) as a continuous potential level of +12 volts which occurs simultaneously with the pulses PO to P9.

The key switch 36 is operated by a key (not shown) representing the arithmetic function of subtraction in order to generate a waveform as shown in FIG. 3 (*d*) together with a positive signal on the line 38. The positive signal on the line 38 is used to indicate the difference between the signal generated when the key representing the arithmetic function of addition is operated and the signal generated when the key representing the arithmetic function of subtraction is operated. If the key switch 36 is in the nonoperated condition as shown in FIG. 1, the key switch 24 can be operated by a key (not shown) representing the arithmetic function of addition so as to transmit the waveform CP7 along the line 30 to the first gate circuit of the function bistable circuit 50 as previously described. The line 32 is prevented from transmitting a CP7 waveform through the second gate circuit to the function bistable circuit 50 because the line 38, which is connected to the bias resistors R30 and R54 of the second gate circuit, is connected to earth potential through the movable contact of the key switch 36. If the key switch 36 is operated by a key (not shown) representing the arithmetic function of subtraction, the movable contact is changed over to contact the normally open fixed contact, so that the line 30 is earthed to prevent the operation of the first gate, and the normally closed fixed contact and the line 38 rises from earth potential to a positive potential so that the second gate circuit passed the CP7 waveform to the function bistable circuit 50. The waveform shown in FIG. 3 (*d*) is transmitted from the function bistable circuit 50 along the function highway HW3, together with positive signal on the line 38.

The digit highway HW2 transmits the following signals:

If the '0' digit switch 8 is closed, a waveform which occurs with the pulses P0

If the '1' digit switch 9 is closed, a waveform which occurs with the pulses P9 and P0

If the '2' digit switch 10 is closed, a waveform which occurs with the pulses P8 to P0

If the '3' digit switch 11 is closed, a waveform which occurs with the pulses P7 to P0

If the '4' digit switch 12 is closed, a waveform which occurs with the pulses P6 to P0

If the '5' digit switch 13 is closed, a waveform which occurs with the pulses P5 to P0

If the '6' digit switch 14 is closed, a waveform which occurs with the pulses P4 to P0

If the '7' digit switch 15 is closed, a waveform which occurs with the pulses P3 to P0

If the '8' digit switch 16 is closed, a waveform which occurs with the pulses P2 to P0

If the '9' digit switch 17 is closed, a waveform which occurs with the pulses P1 to P0

The function highway HW3 transmits the following signals:

If the 'switch 24 is closed, a waveform which occurs with the pulses P8 to P0 and a zero potential on the line 38.

If the '–' switch 36 is closed, a waveform which occurs with the pulse P8 to P0 and a positive potential on the line 38.

If the '' switch 26 is closed, a waveform which occurs with the pulse P6 to P0.

If the '×' switch 28 is closed, a waveform which occurs with the pulse P4 to P0.

It can be seen that the signals on the digit highway HW2 and the function highway HW3 always include the pulse P0. Thus the presence of the P0 pulse can be used to identify these signals from other signals within the calculating machine.

The signal-generating circuit has the advantage that the lines needed to transmit digit and function signals from a keyboard of a calculating machine are reduced in number. The signal-generating circuit has the further advantage that the digit and function signals include a pulse P0 which can be used to indicate that a key on the keyboard has been operated so as to generate a signal.

A signal on the digit highway HW2 may be gated so as to remove the P0 pulses so that the signal then contains trains of pulses where each train of pulses contains the same number of pulses as the digit represented by the key which initiated the generation of the signal. The digit highway HW2 may be associated with a bistable circuit which is set by the depression of a key representing a digit and which is not reset until the part of the signal which occurs with the pulse P0 has been generated, so as to prevent from a single depression of a key the multiple transmission of the signal within the calculating machine.

What we claim is:

1. A calculating machine having a circuit for generating electrical signals representative of the operated keys of a keyboard, said signal-generating circuit comprising a source of pulses, a pulse counter and pulse lengthener whose input is connected to said source of pulses and which at a plurality of outputs provides a plurality of different lengthened pulse output waveforms, a keyboard comprising a plurality of keys each key including a key switch having at least two contacts which are moved by the operation of the key, means connecting one of the contacts of the key switch to one of the outputs of the pulse counter and lengthener, a bistable circuit with two inputs having one of the inputs connected to the other contacts of each of a given plurality of the key switches, a circuit connecting the other of the bistable circuit inputs to an output of the pulse counter and lengthener, said foregoing elements operating so as to cause, when one said key of the keyboard is operated, (1) the output of said bistable circuit to be changed from one state to the other state by the lengthened pulse output identified by the operated key and connected thereby to the one input of the bistable circuit and (2) the output of the bistable circuit to be changed from the other state to the one state by said output of the pulse counter and lengthener connected to the other input of the bistable circuit so that the output of the bistable circuit transmits a different signal for each operated key.

2. A calculating machine according to claim 1, wherein said source of pulses provides periodic input pulses to said pulse counter and lengthener including circuit means causing the outputs of the pulse counter and lengthener to be sequentially energized at the input pulse repetition frequency and including circuit means causing the input pulse repetition frequency to be an integral multiple of the output pulse repetition frequency.

3. A calculating machine according to claim 2, wherein the pulse counter and lengthener has 10 outputs and the input pulse repetition frequency is 10 times the output pulse repetition frequency.

4. A calculating machine according to claim 1, wherein the bistable circuit includes a potential divider circuit connected for biasing both the input circuits of said bistable circuit; and wherein the said one input of the bistable circuit includes a first gate circuit connected for passing said lengthened pulse outputs transmitted by said keys of the keyboard.

5. A calculating machine according to claim 4 wherein the said one input of the bistable circuit further includes a particular second gate circuit for gating the lengthened pulse outputs transmitted by one of said keys of the keyboard, the second gate circuit including an inhibit connection to the input circuit of said other input of said bistable circuit; and wherein the second gate circuit is connected to that said output of the pulse counter and lengthener which is connected to the other input of the bistable circuit with corresponding circuits causing, when the said particular key associated with the key switch of the second gate circuit is operated, the lengthened pulse on the second gate circuit to inhibit on the application of the same lengthened pulse to the input circuit of the other input of the bistable circuit so that the output of the bistable circuit transmits a constant voltage level as the signal when said particular key is operated.

6. A calculating machine according to claim 5, wherein the pulse counter and lengthener has 10 outputs and wherein the keys on the keyboard include a set of keys among said plurality of keys, said set representing the digits 0 to 9 respectively, and the key switches of the set of keys are connected to 10 outputs of the plurality of pulse counter and lengthener outputs respectively.

7. A calculating machine according to claim 6, wherein the key representing the digit 9 is said particular key connected to the second gate circuit; whereby, when the key representing the digit 9 is operated, the output of the bistable circuit transmits a voltage level as the signal representative of the key representing the digit 9.

8. A calculating machine according to claim 4, wherein the said one input of the bistable circuit further includes a second gate circuit for gating the lengthened pulse outputs transmitted by at least one of the keys of the keyboard, means providing bias potential, means connecting the bias potential to the second gating circuit by a key switch of the keyboard so that the second gating circuit is biased to allow the lengthened pulse output transmitted by said at least one of the keys through the second gating circuit to the one input of the bistable circuit.

9. A calculating machine according to claim 8, wherein the last-mentioned key switch is a changeover switch having two fixed contacts and a movable contact, means connecting one of the fixed contacts to the said bias potential of the second gate circuit, means connecting the other fixed contact to the first gate circuit, means holding the movable contact normally against the one of the fixed contacts, means providing a bias potential to said movable contact which prevents the transmission of lengthened pulses through the first and second gate circuits, and means connecting a selected one of said lengthened pulse outputs to the second gate circuit to provide that when the changeover switch is operated by operation of the corresponding key on the keyboard the first gate circuit is biased so as to prevent the application of pulses to the one input of the bistable circuit and the second gate circuit is biased so as to allow the application of the selected lengthened pulse output to the one input of the bistable circuit.

10. A calculating machine according to claim 8, wherein the pulse counter and lengthener has 10 outputs and wherein the keys on the keyboard include keys representing internal programs which the calculating machine can perform and each of the key switches is connected to one lengthened pulse output of the pulse counter and lengthener.

11. A calculating machine according to claim 1, wherein the source of pulses is an oscillator.

12. A calculating machine according to claim 1, wherein the pulse counter and lengthener is a plurality of bistable circuits interconnected so as to form a ring circuit.

13 A calculating machine according to claim 1, wherein the signal-generating circuit includes an inverter circuit connected to an output of the bistable circuit.

* * * * *